United States Patent
Matsumura

(10) Patent No.: US 6,724,938 B1
(45) Date of Patent: Apr. 20, 2004

(54) BOUNDARY LINE DETECTING METHOD AND APPARATUS, IMAGE PROCESSING METHOD AND APPARATUS, NON-BOUNDARY LINE DETECTING METHOD AND APPARATUS

(75) Inventor: Shigeru Matsumura, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 624 days.

(21) Appl. No.: 09/718,166

(22) Filed: Nov. 21, 2000

(30) Foreign Application Priority Data

Dec. 16, 1999 (JP) .............................. 11-356925

(51) Int. Cl.[7] .............................. G06K 9/48; G06K 9/36; G06K 9/40
(52) U.S. Cl. .......................... 382/199; 382/236; 382/266
(58) Field of Search ................................ 382/199, 236, 382/242, 256, 266, 305; 600/437, 443

(56) References Cited

U.S. PATENT DOCUMENTS

| 5,588,435 A | * | 12/1996 | Weng et al. ................. 600/443 |
| 5,764,803 A | * | 6/1998 | Jacquin et al. .............. 382/236 |
| 5,881,170 A | | 3/1999 | Araki ........................... 382/199 |
| 6,075,875 A | * | 6/2000 | Gu .............................. 382/107 |
| 6,511,426 B1 | * | 1/2003 | Hossack et al. ............. 600/437 |

FOREIGN PATENT DOCUMENTS

| EP | 1058208 | 12/2000 | ............. G06T/5/00 |

OTHER PUBLICATIONS

Pardas et al, "Motion and Region Overlapping Estimation for Segmentation–Based Video Coding", 1994, IEEE Paper ISBN: 0–8186–6950, pp. 428–432.*

Chang "Human heart motion analysis thorgh normal flow methods" Nuclear Science Symposium and Medical imaging conference, US, NY IEE vol. Oct. 30, 1993, PP1572–5 (copy enclosed).

* cited by examiner

Primary Examiner—Mehrdad Dastouri
(74) Attorney, Agent, or Firm—Moonray Kojima

(57) ABSTRACT

To detect a boundary line between different objects in contact which appear to be the same object as their structural consistencies are identical or substantially identical, there are provided a motion vector detecting unit which calculates motion vectors in plural parts from plural images obtained at different times, a boundary block extracting unit which extracts a boundary block from the difference of motion vectors, and a boundary line estimating unit which estimates a boundary line based on the extracted boundary block.

10 Claims, 6 Drawing Sheets

Boundary line detecting apparatus

Boundary line detecting apparatus

Ultrasound diagnostic apparatus

Ultrasound diagnostic apparatus

BOUNDARY LINE DETECTING METHOD AND APPARATUS, IMAGE PROCESSING METHOD AND APPARATUS, NON-BOUNDARY LINE DETECTING METHOD AND APPARATUS

BACKGROUND OF THE INVENTION

This invention relates to a boundary line detecting apparatus, image processing apparatus and non-boundary line detecting apparatus. More specifically, it relates to a boundary detecting apparatus which can detect the boundary line of different objects in contact which appear to be one object due to the fact that their structural consistencies are identical or substantially identical, to an image processing apparatus which can obtain a three-dimensional image of a fetus without interference from a uterus wall in contact with the fetus, to a non-boundary line detecting apparatus which can detect a non-boundary line of different objects in contact which appear to have a boundary as their structural consistencies are largely different, but which are actually part of the same structure, and to an image forming apparatus which can depict a liver so that an invasive cancer on the liver surface can be identified.

In an ultrasound diagnostic apparatus, an ultrasonic probe is moved in a perpendicular direction to a scanning surface to obtain three-dimensional data reflecting a three-dimensional structure, and a three-dimensional image is formed and displayed as if the three-dimensional structure were viewed from a desired line of sight direction.

FIG. 1 is a schematic view of three-dimensional data obtained by scanning a fetus F in a mother's body by an ultrasound diagnostic apparatus.

When it is attempted to form a three-dimensional image of the fetus F from the data of FIG. 1, due to the presence of a uterus wall W outside the fetus F, the uterus wall W constitutes an obstacle so that a three-dimensional image of the fetus F cannot be formed. Hence, the operator sets a region of interest ROI, and forms a three-dimensional image so that structures outside the region of interest ROI cannot be seen, as shown in FIG. 2.

However, if part of the fetus F is in contact with the uterus wall W, it is impossible to distinguish the boundary as the structural consistencies of the fetus F and uterus wall W are substantially identical, so the operator cannot set a region of interest ROI correctly, as shown in FIG. 3.

SUMMARY OF THE INVENTION

It is therefore a first object of this invention to provide a boundary detecting apparatus which can detect a boundary line of different objects in contact which appear to be the same object as their structural consistencies are identical or substantially identical, and to provide an image processing apparatus which can obtain a three-dimensional image of a fetus without obstruction by the uterus wall in contact with the fetus.

FIG. 4 is a schematic view of three-dimensional data obtained by scanning a liver L with invasive cancer C by an ultrasound diagnostic apparatus.

The liver L is covered by a peritoneum P, and as the two have different structural consistencies, the surface of the liver L can be extracted based on the difference of structural consistencies and a three-dimensional image of the surface Ls of the liver can be formed, as shown in FIG. 5.

However, in this three-dimensional image, it was impossible to distinguish the part with the invasive cancer C adhering to the peritoneum P.

It is therefore a second object of this invention to provide a non-boundary line detecting apparatus which can detect a non-boundary line of different objects in contact which appear to have a boundary as their structural consistencies are largely different, but which are actually part of the same structure, and to provide an image processing apparatus which can depict a liver such that invasive cancer on the liver surface can be identified.

In a first aspect, this invention provides a boundary line detecting apparatus comprising a motion vector detecting means which calculates motion vectors of plural parts in a first or second image from a first image obtained by imaging at a first time and from a second image obtained by imaging at a second time, a boundary part extracting means which extracts a moving boundary part from the difference between the motion vectors of the plural parts, and a boundary line estimating means which estimates a boundary line between objects with different motion based on the extracted boundary part.

Even if different objects in contact appear to be the same object because their structural consistencies are identical or substantially identical, if the different objects are not part of the same structure, a difference in the motion of the two arises in many cases.

Therefore, in the boundary line detecting apparatus of the first aspect, motion vectors in plural parts of the image are found from plural images obtained at different times, a boundary part is extracted from this difference, and a boundary line between the different objects is estimated from this boundary part. In this way, the boundary line between different objects in contact which appear to be the same object because their structural consistencies are identical or substantially identical, can be detected.

In the above construction, the plural parts may for example be obvious parts such as speckles (granular noise), points on a virtual lattice on the image, or all of the picture elements of the image.

In the aforesaid construction, the boundary line may be estimated by finding the straight line or curve which best fits the boundary part, e.g. by the method of least squares.

The motion of the objects may be an automatic motion such as a respiration or pulse, or it may be forcibly produced by applying an external force (e.g., pressing hard with the ultrasonic probe).

In a second aspect, this invention provides an image processing apparatus which forms an image based on data reflecting a two-dimensional structure, comprising a boundary line detecting means which detects a boundary line in the two-dimensional structure using the boundary line detecting apparatus of the first aspect, and a filter means which forms or displays an image so that the two sides of the boundary line can be distinguished when the image is formed or displayed.

In the image processing apparatus of the second aspect, an image is formed or displayed so that the two sides of the boundary line detected using the boundary line detecting apparatus of the first aspect can be distinguished, so a region of interest can be automatically set or easily set by an operator so as to exclude one of the objects on either side of the boundary line.

In a third aspect, this invention provides an image processing apparatus which forms a three-dimensional image when a three-dimensional structure is viewed from a desired line of site direction based on data reflecting the three-dimensional structure, comprising a boundary surface detecting means which detects a boundary surface in the three-dimensional structure using the boundary line detecting apparatus of the first aspect, and a filter means which forms or displays a three-dimensional image such that the three-dimensional structure which is in front of the boundary surface in the line of sight direction cannot be seen when the three-dimensional image is formed or displayed.

In the image processing apparatus of the third aspect, a boundary surface is detected using the boundary line detecting apparatus of the first aspect on data reflecting a three-dimensional structure, and a three-dimensional image is formed or displayed such that the three-dimensional structure which is in front of the boundary surface in the line of site direction cannot be seen. Therefore, a three-dimensional image of, for example, a fetus can be obtained without interference from the uterus wall in contact with the fetus.

In a fourth aspect, this invention provides a non-boundary line detecting apparatus comprising an object contour line extracting means which extracts a contour line of an object in a two-dimensional structure based on data reflecting the two-dimensional structure, and a non-boundary line detecting means which detects a part which is a contour line of the object but not a boundary line as a non-boundary line using the boundary line detecting apparatus of the first aspect.

If a part of the imaging object is integrated with a surrounding object, no difference emerges in the motion of the two in this part, so if the part where there is no difference of motion is situated on the contour line of the imaging object, it is understood that the two are integrated in this part.

Therefore, in the non-boundary line detecting apparatus of the fourth aspect, motion vectors of plural parts in an image are found from plural images obtained at different times, the boundary line is extracted from their difference, and a part of the object which is a contour line but not a boundary line is detected as a non-boundary line. In this way, a non-boundary line is detected in different objects in contact which appear to have a boundary line as their structural consistencies are largely different, but which are actually part of the same structure.

In a fifth aspect, this invention provides an image processing apparatus, comprising an object surface extracting means which extracts the surface of an object contained in a three-dimensional structure based on data reflecting the three-dimensional structure, a non-boundary surface detecting means which detects a part which is a surface of an object but not a boundary surface as a non-boundary surface using the non-boundary line detecting apparatus of the fourth aspect on the data, and an object surface/non-boundary surface image forming means which forms and displays an image or three-dimensional image of the surface and non-boundary surface of the object.

In the image forming apparatus of the fifth aspect, a non-boundary surface is detected using the non-boundary line detecting apparatus of the fourth aspect on data reflecting a three-dimensional image, and an image or three-dimensional image of the surface and non-boundary surface of the object is formed or displayed. Therefore, for example, a liver can be depicted so as to be able to identify invasive cancer on the liver surface.

From another aspect, this invention provides a boundary line detecting method wherein motion vectors of plural parts in an image are found from plural images obtained at different times, a boundary part is extracted from their difference, and a boundary line is estimated from this boundary part.

From another aspect, this invention provides an image processing method which forms or displays an image such that two sides of a boundary line detected using the boundary line detecting method, can be identified.

From another aspect, this invention provides an image processing method which detects a boundary surface using the boundary line detecting method on data reflecting a three-dimensional structure, and forms or displays a three-dimensional image such that the three-dimensional structure which is in front in the line of sight direction from the boundary surface cannot be seen.

From another aspect, this invention provides a non-boundary line detecting method wherein motion vectors of plural parts in an image are found from plural images obtained at different times, a boundary part is extracted from their difference, and a part which is not the boundary part but which is a contour line of the object is detected as a non-boundary line.

From yet another aspect, this invention provides an image processing method which detects a non-boundary surface using the non-boundary line detecting method on data reflecting a. three-dimensional structure, and forms or displays an image or three-dimensional image of the surface and non-boundary surface of the object.

According to the boundary line detecting apparatus and image processing apparatus of this invention, a boundary line can be detected between different objects in contact which appear to be same object as their structural consistencies are identical or substantially identical, and a three-dimensional image of a fetus can be depicted without interference from a uterus wall in contact with the fetus.

Further, according to the non-boundary line detecting apparatus and image processing apparatus of this invention, a non-boundary line can be detected between different objects in contact which appear to have a boundary as their structural consistencies are largely different, but which are actually part of the same structure, and a liver can be detected so that invasive cancer on the liver surface can be identified.

Further objects and advantages of the present invention will be apparent from the following description of the preferred embodiments of the invention as illustrated in the accompanying drawings.

DETAILED DESCRIPTION OF THE INVENTION

Figure 5:
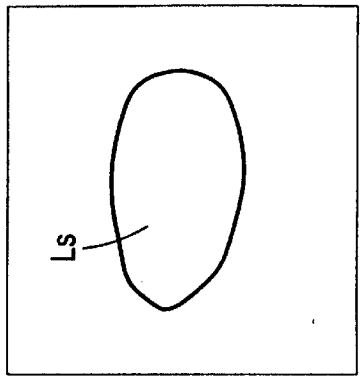
FIG. 5 is a typical diagram of a three-dimensional image depicting the surface of the liver.
Figure 2:
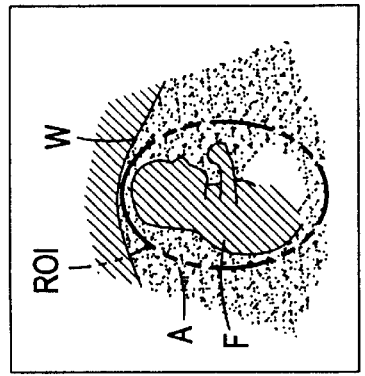
FIG. 2 is a descriptive diagram of an example where a region of interest on an image can be set.
Figure 1:
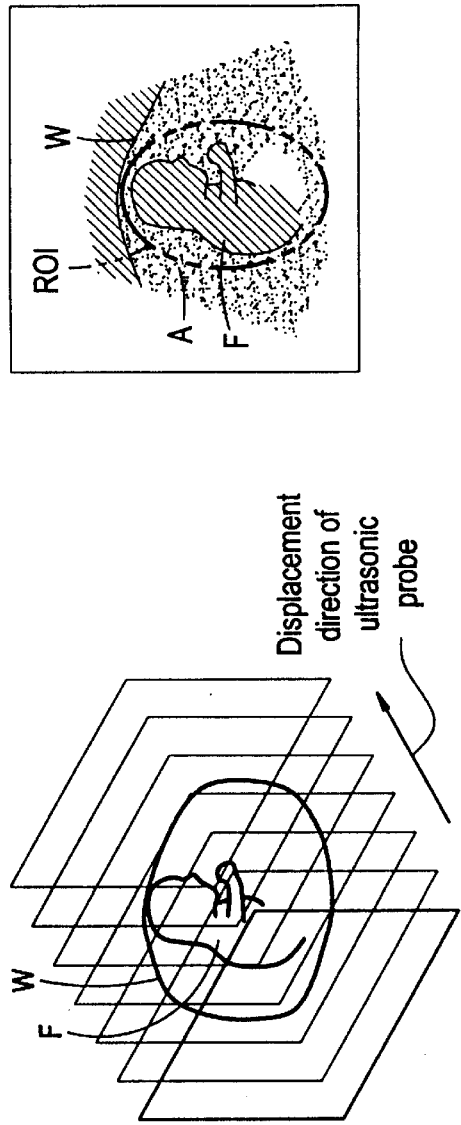
FIG. 1 is a conceptual diagram of three-dimensional data imaging a fetus.

This Invention will now be described in further detail with reference to specific embodiments shown in the drawings.

Embodiment 1

Figure 6:
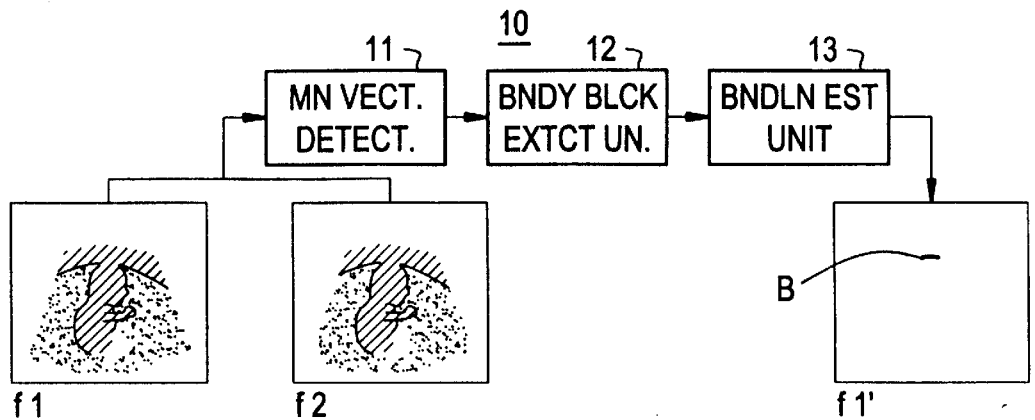
FIG. 6 is a schematic view showing a boundary line detecting apparatus according to the first embodiment of this invention.

FIG. 6 is a schematic view showing a boundary detecting apparatus according to a first embodiment of this invention.

A boundary detecting apparatus 10 comprises a motion vector detecting unit 11, a boundary block extracting unit 12 and a boundary estimating unit 13. From a first image f1 and second image f2 obtained by imaging the same scanning surface at different times, a boundary line B is detected between different objects which appear to be the same object on these images.

The motion vector detecting unit 11 operates by performing the following processing sequence.
(1) A first high frequency component image and a second high frequency component image are formed by subtracting a low frequency component image obtained by respectively smoothing the first image f1 and second image f2 from an original image.
(2) Autocorrelations are respectively found for the first high frequency component image and second high frequency component image, and parts for which the correlation number is larger than a preset lower threshold value and less than an upper threshold value are marked as speckles. In this way, a first speckle image and second speckle image are obtained in which speckles are marked in a part where speckles are obvious. The reason why the part where the correlation number is larger than a preset upper threshold value is excluded, is because this part is estimated as the edge.
(3) In the vicinity of a target speckle on the first speckle image, a correlation with the second speckled image is taken, and the speckle on the second speckle image which has the largest correlation is estimated as the displacement position of the target speckle. A motion vector is then generated having the point on the first speckle image corresponding to this displacement position as the end, and the target speckle as the start. This is done for all speckles on the first speckle image.
(4) The motion vectors are averaged for all speckles on the first speckle image to calculate an average motion vector, and a motion vector is calculated by subtracting this average motion vector from all motion vectors.

Figure 7A:
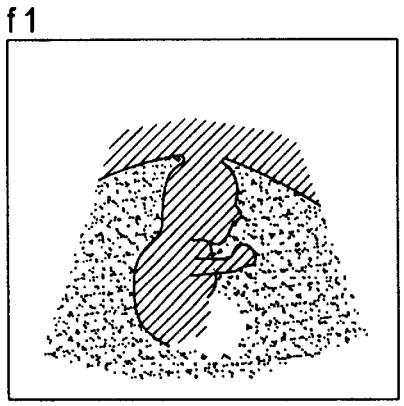
FIG. 7 is a typical diagram of two images obtained at different scanning times by the same scanning apparatus.
Figure 7B:
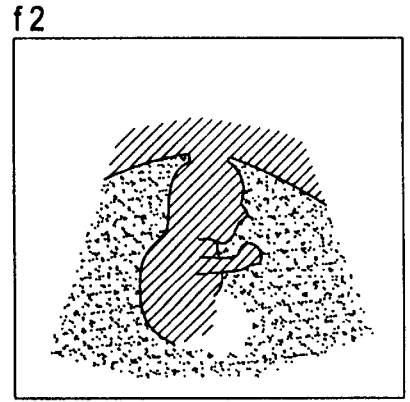
Figure 8:
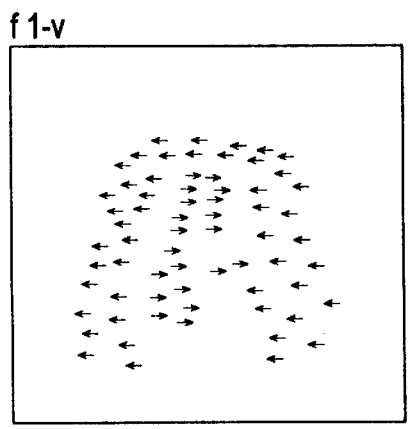
FIG. 8 is a conceptual diagram showing a distribution of motion vectors obtained from the images in FIG. 7.

An image f1-v which schematically represents the distribution of motion vectors obtained from the first image f1 and second image f2 shown in FIG. 7, is shown as an example in FIG. 8.

In the above, the motion vector was found by extracting a part where speckles were obvious, however the motion vector may be found also for points on a virtual lattice on the image, or for all picture elements of the image.

Figure 9:
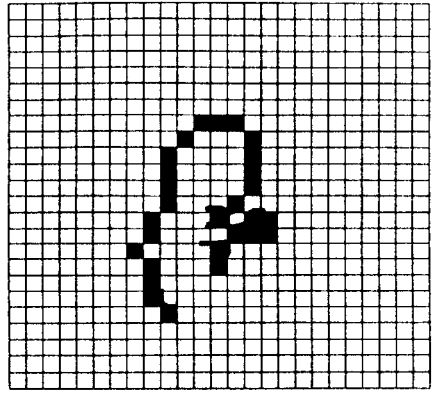
FIG. 9 is a conceptual diagram showing boundary blocks extracted from the distribution of motion vectors in FIG. 8.

The above boundary block extracting unit 12 operates by the following processing sequence.
(1) The image is divided into small blocks, and the motion vectors in each block are averaged to calculate an average motion vector for each block, as shown in FIG. 9.
(2) The sign of the average motion vector for a target block and the sign of the average motion vector for an adjacent block are compared, and if the sign in at least one of the x direction and y direction are different, this target block is selected as the boundary block. This is performed for all blocks.

Blocks which are colored black in FIG. 9 are extracted boundary blocks.

Figure 10:
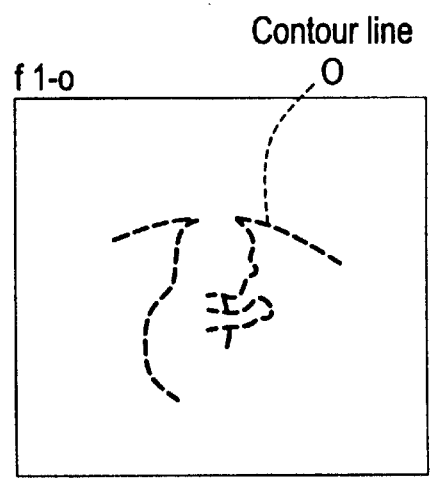
FIG. 10 is a conceptual diagram showing a contour line extracted from the images in FIG. 7.
Figure 11:
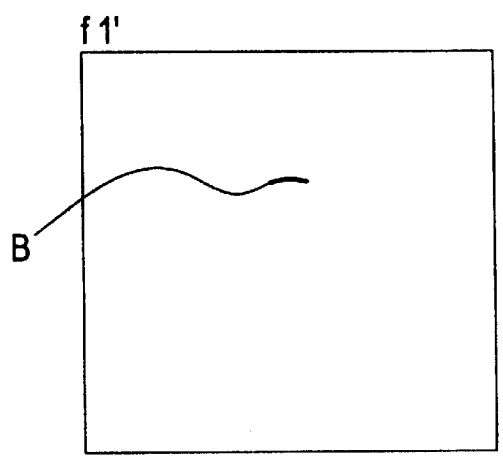
FIG. 11 is a conceptual diagram showing a boundary line detected by the boundary line detecting apparatus in FIG. 6.

The boundary estimating unit 13 operates by the following processing sequence.
(1) When there is a sufficient number of speckles contained in each block, the edge of the boundary block is detected and taken as a boundary candidate line. When there are few speckles contained in each block, the boundary candidate line is computed by fitting a straight line equation or curve equation using the method of least squares, for example.
(2) The edge is detected for the first image f1, and a contour line O is obtained, as shown in FIG. 10.
(3) A part which is not the contour line O but which is a boundary candidate line is estimated as the boundary line B in the first image f1, as shown in FIG. 11.

If the edge is detected and the contour line O is obtained for the second image f2, the boundary line in the second image f2 can be estimated.

As described above, according to the boundary detecting apparatus 10, the boundary line B between different objects which appear to be the same object can be detected.

Embodiment 2

Figure 12:
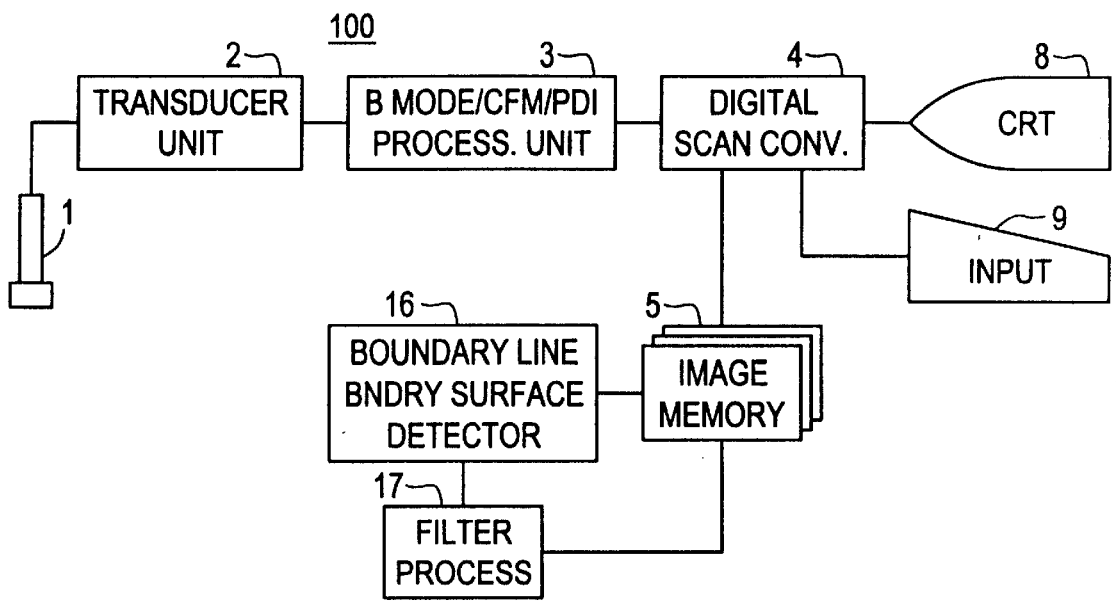
FIG. 12 is a schematic view showing an ultrasound diagnostic apparatus according to a second embodiment of this invention.

FIG. 12 is a schematic view showing an ultrasound diagnostic apparatus according to a second embodiment of this invention.

An ultrasound diagnostic apparatus 100 comprises an ultrasonic probe 1, a transducer unit 2 which transmits a transmitting pulse, receives an ultrasonic wave echo and performs beam-forming to generate a received echo signal, a B mode/CFM/PDI processing unit 3 which forms B mode data, CFM (Colour Flow Mapping) data or PDI (Power Doppler Image) data from the received echo signal, a DSC (Digital Scan Converter) 4 which generates B mode images, CFM images or PDI images from the B mode data, CFM data or PDI data, an image memory 5 which stores plural B mode images, CFM images or PDI images obtained by repeatedly forming B mode images, CFM images or PDI images as three-dimensional data while moving the ultrasonic probe 1 in a perpendicular direction to the scanning surface, a boundary line/boundary surface detecting unit 16 which detects a boundary line or a boundary surface using the boundary detecting apparatus 10 of the first embodiment on the three-dimensional data stored in this image memory 5, a filter processing unit 17 which forms a boundary identification image in which the two sides of the boundary line can be identified, and a three-dimensional image in which the three-dimensional structure in front of the boundary surface in the line of sight direction cannot be seen, a CRT 8 which displays the B mode images, CFM images or PDI images, or boundary identification image or three-dimensional image, and an input unit 9 into which an operator inputs commands.

Figure 13:
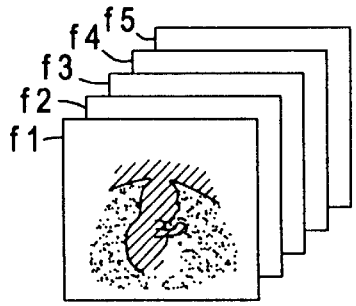
FIG. 13 is a conceptual diagram of three-dimensional data imaging a fetus.

FIG. 13 is a schematic view of three-dimensional data stored in the image memory 5.

The scanning times and scanning positions of the images f1, f2 are different, but if the depth of the ultrasonic beam is adjusted, adjacent images can be considered to be identical scanning positions. Hence, a boundary line in the image f1 is detected using the boundary detecting apparatus 10 of the first embodiment on the adjacent images f1, f2, and a boundary line in the image f2 is detected using the boundary detecting apparatus 10 of the first embodiment on the adjacent images f2, f3. By repeating this procedure thereafter, boundary lines in all the images f1, f2 are detected, and if these are joined, a boundary surface can be detected.

Figure 14:
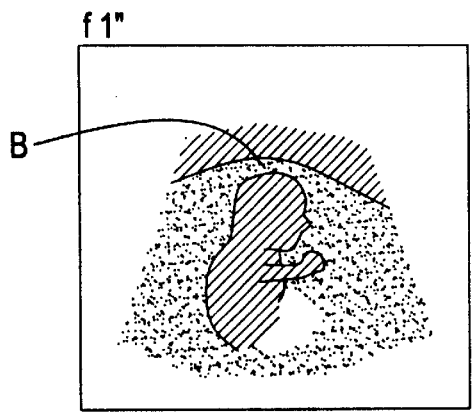
FIG. 14 is a typical diagram of a boundary line identifying image obtained by the ultrasound diagnostic apparatus in FIG. 12.

FIG. 14 shows an example of the boundary identifying image.

The filter processing unit 17 searches for a pixel having a pixel value largely different from an original pixel value on the boundary line B in the vicinity of both ends of the boundary line B, and the pixel value of this pixel is taken as the pixel value of the boundary line B. In this way, objects on either side of the boundary line B can be displayed separately.

Figure 15:
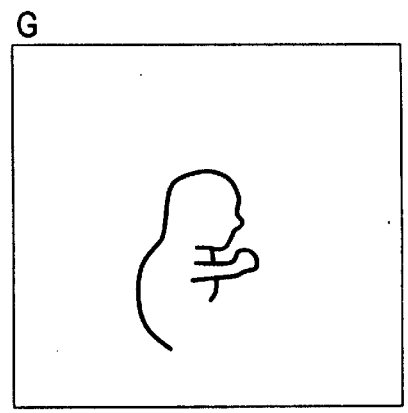
FIG. 15 is a typical diagram of a three-dimensional image obtained by the ultrasonic diagnostic apparatus in FIG. 12.

FIG. 15 shows an example of the three-dimensional image.

The three-dimensional structure at the rear of the boundary surface B in the line of sight direction can be depicted without interference from the three-dimensional structure in front of the boundary surface B in the line of sight direction.

As described above, according to the ultrasound diagnostic apparatus 100, a three-dimensional image of a fetus can be obtained without obstruction from the uterus wall in contact with the fetus.

Embodiment 3

Figure 16:
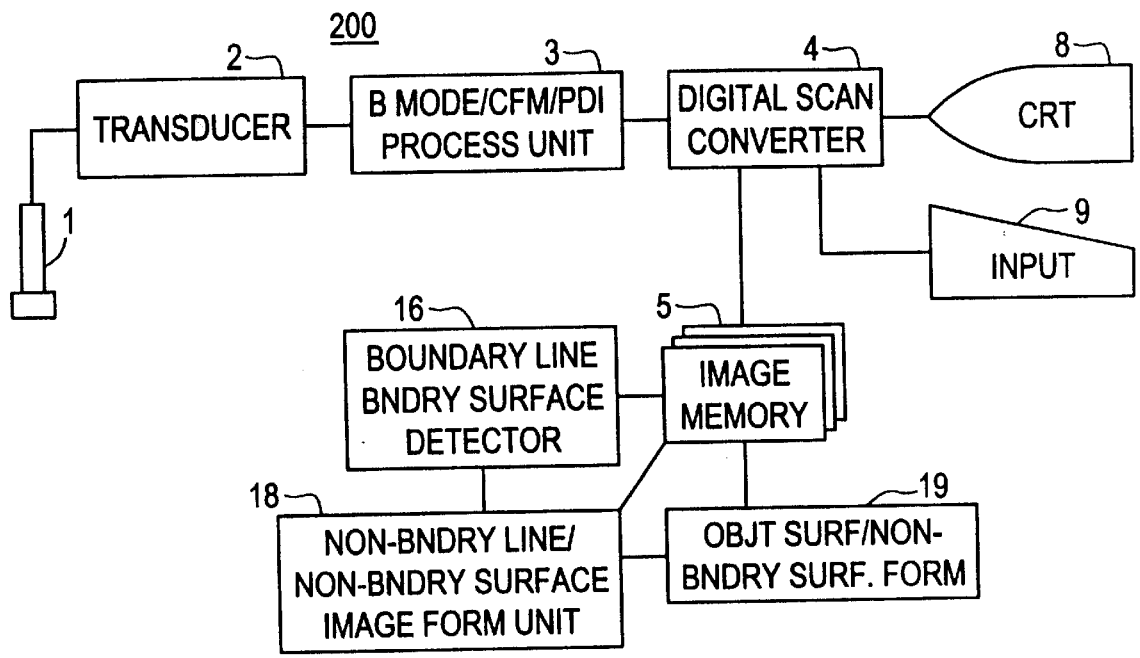
FIG. 16 is a schematic view showing an ultrasonic diagnostic apparatus according to a third embodiment of this invention.

FIG. 16 is a schematic view showing an ultrasound diagnostic apparatus according to a third embodiment of this invention.

An ultrasound diagnostic apparatus 200 comprises an ultrasonic probe 1, a transducer unit 2 which transmits a transmitting pulse, receives an ultrasonic wave echo and performs beam-forming to generate a received echo signal, a B mode/CFM/PDI processing unit 3 which forms B mode data, CFM data or PDI data from the received echo signal, a DSC 4 which generates B mode images, CFM images or PDI images from the B mode data, CFM data or PDI data, an image memory 5 which stores plural B mode images, CFM images or PDI images obtained by repeatedly forming B mode images, CFM images or PDI images as three-dimensional data while moving the ultrasonic probe 1 in a perpendicular direction to the scanning surface, a boundary line/boundary surface detecting unit 16 which detects a boundary line or a boundary surface using the boundary detecting apparatus 10 of the first embodiment on the three-dimensional data stored in this image memory 5, a non-boundary line/non-boundary surface detecting unit 18 which detects a part which is a contour line but not a boundary line of the object as a non-boundary line, and detects a part which is a surface but not a boundary surface of the object as a non-boundary surface, an object surface/non-boundary surface image forming unit 19 which forms and displays an image or a three-dimensional image of a surface and a non-boundary surface of the object, a CRT 8 which displays the B mode images, CFM images or PDI images, or an image or three-dimensional image of a surface and a non-boundary surface of the object, and an input unit 9 into which an operator inputs commands.

Figure 4:
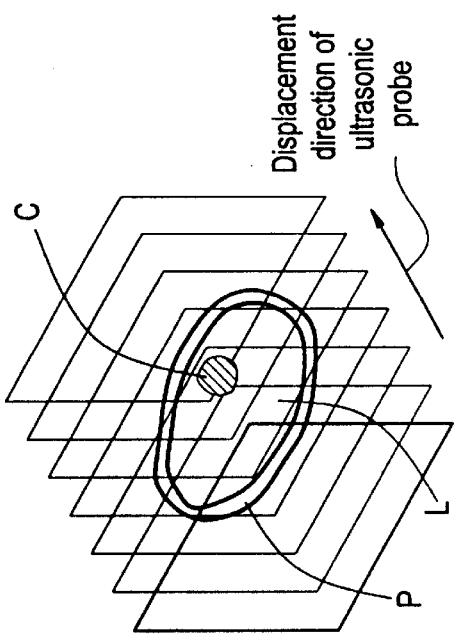
FIG. 4 is a plan view of three-dimensional data imaging a liver.
Figure 3:
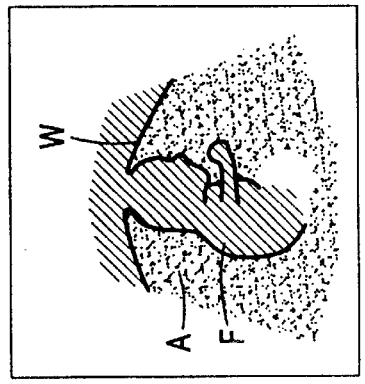
FIG. 3 is a descriptive diagram of an example where a region of interest of an image cannot be set.
Figure 17:
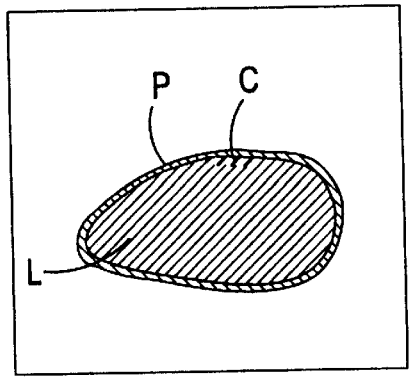
FIG. 17 is a typical diagram of one image in the three-dimensional data.

FIG. 17 is a typical diagram of one image forming the three-dimensional data shown in FIG. 4.

Figure 18:
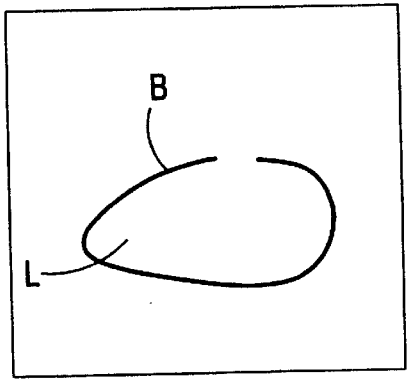
FIG. 18 is a conceptual diagram of the boundary line detected by the ultrasound diagnostic apparatus in FIG. 16.

FIG. 18 is a typical diagram of the boundary line B detected by the boundary line/boundary surface detecting unit 16 using two adjacent images of the images in the three-dimensional data shown in FIG. 4.

In the part of the invasive cancer C adhering to the liver L and peritoneum P, the motions of the liver L and peritoneum P are identical, and as there is no difference, the boundary line B cannot be detected.

Figure 19:
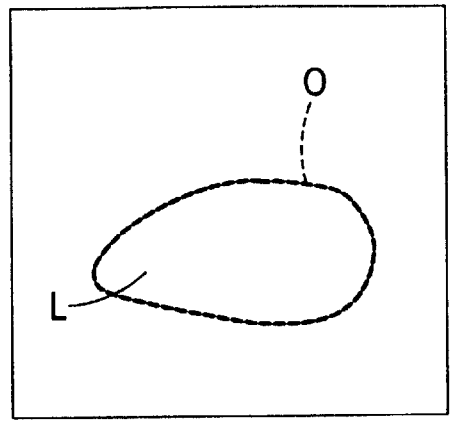
FIG. 19 is a conceptual diagram of a contour line extracted by the ultrasound diagnostic apparatus in FIG. 16.

FIG. 19 is a typical diagram of the contour line O of the liver L extracted by the non-boundary line/non-boundary surface detecting unit 18 using the image of FIG. 17.

As the structural consistencies of the liver L and peritoneum P are different, the contour line O of the liver L can be extracted based on the difference of structural consistencies.

Figure 20:
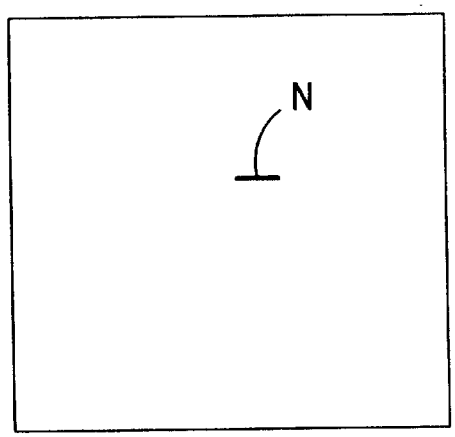
FIG. 20 is a conceptual diagram of a non-boundary line detected by the ultrasound diagnostic apparatus in FIG. 16.

FIG. 20 is a typical diagram of a non-boundary line N extracted by the non-boundary line/non-boundary surface detecting unit 18 using the boundary line B of FIG. 18 and the contour line O of FIG. 19.

The non-boundary line/non-boundary surface detecting unit 18 detects a part which is not the boundary line B in FIG. 18, and which is the contour line O in FIG. 19, as the non-boundary line N.

Figure 21:
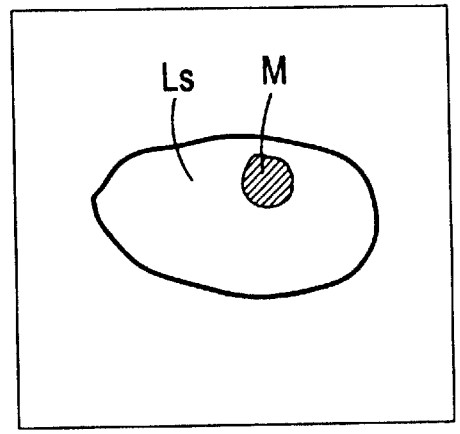
FIG. 21 is a typical diagram of a three-dimensional image obtained by the ultrasound agnostic apparatus in FIG. 16.

The non-boundary line N is detected for all images in the three-dimensional data shown in FIG. 4, and these are joined to detect a non-boundary surface (M in FIG. 21).

FIG. 21 is a typical diagram of the three-dimensional image formed by the object surface/non-boundary surface image forming unit 19.

The object surface/non-boundary surface image forming unit 19 extracts the contour line O of the liver L for all images in the three-dimensional data shown in FIG. 4, joins these and extracts the surface Ls of the liver L. Next, the non-boundary surface M is superimposed on this surface Ls. A three-dimensional image is then formed as if viewed from a specified line of sight direction.

As described above, according to the ultrasound diagnostic apparatus 200, a non-boundary line is detected for different objects in contact which appear to have a boundary as their structural consistencies are largely different, but which are actually part of the same structure. Therefore, the liver L can be depicted such that the invasive cancer C on the surface of the liver L can be identified.

Many widely different embodiments of the invention may be configured without departing from the spirit and the scope of the present invention. It should be understood that the present invention is not limited to the specific embodiments described in the specification, except as defined in the appended claims.

What is claimed is:

1. A processing apparatus comprising:
   means for detecting motion vectors of a plurality of parts having nearly the same consistencies in a first image or a second image from said first image obtained by imaging at a first time and from said second image obtained by imaging at a second time, said means for detecting comprising:
   means for forming a first high frequency component image and a second high frequency component image and for generating said motion vectors therefrom, and
   means for averaging said motion vectors;
   means for extracting a moving boundary between said first image and said second image from differences between said motion vectors of said plurality of parts, said means for extracting comprising:
   means for dividing said first image or said second image into a plurality of blocks,
   means for calculating average motion vectors for each block; and
   means for selecting a target block when said average motion vector thereof is a different sign; and
   means for estimating a boundary line between two or more objects which appear to be the same object in said first image or said second image, with different motion vectors based on said extracted moving boundary part.

2. The apparatus of claim 1, further comprising:
   means for detecting said boundary line between said two or more objects in a two dimensional structure; and
   means for forming an image from data representing said two dimensional structure so that two sides of said boundary line are detected when said image is formed.

3. The apparatus of claim 1, further comprising:
   means for detecting a boundary surface of a three dimensional structure; and
   means for forming a three dimensional image from data representing said three dimensional structure such that said three dimensional structure which is in front of a boundary surface in a line of sight direction cannot be seen when said three dimensional image is formed.

4. The apparatus of claim 1, further comprising:
   means for extracting an outline of an object in a two dimensional structure based on data representing said two dimensional structure; and
   means for detecting a non-boundary line which is an outline of said object but not a boundary line.

5. The apparatus of claim 1, further comprising:
   means for extracting a surface of an object contained in a three dimensional structure based on data representing a three dimensional structure;
   means for detecting a non-boundary surface which is said surface of said object but which is not a boundary surface; and
   means for forming an image of said surface and said non-boundary surface of said object.

6. A processing method comprising the steps of:
   detecting motion vectors of a plurality of parts having nearly the same consistencies in a first image or a second image from said first image obtained by imaging at a first time and from said second image obtained by imaging at a second time, said detecting step comprising the sub-steps of:
   forming a first high frequency component image and a second high frequency component image and for generating said motion vectors therefrom, and
   averaging said motion vectors;
   extracting a moving boundary between said first image and said second image from differences between said motion vectors of said plurality of parts, said extracting step comprising the sub-steps of:
   dividing said first image or said second image into a plurality of blocks,
   calculating average motion vectors for each block, and
   selecting a target block when said average motion vector thereof is a different sign; and
   estimating a boundary line between two or more objects which appear to be the same object in said first image or said second image, with different motion vectors based on said extracted moving boundary part.

7. The method of claim 6, comprising the further steps of:
   detecting said boundary line between said two or more objects in a two dimensional structure; and
   forming an image from data representing said two dimensional structure so that two sides of said boundary line are detected when said image is formed.

8. The method of claim 6, comprising the further steps of:
   detecting a boundary surface of a three dimensional structure; and
   forming a three dimensional image from data representing said three dimensional structure such that said three dimensional structure which is in front of a boundary surface in a line of sight direction cannot be seen when said three dimensional image is formed.

9. The method of claim 6, comprising the further steps of:
   extracting an outline of an object in a two dimensional structure based on data representing said two dimensional structure; and
   detecting a non-boundary line which is an outline of said object but not a boundary line.

10. The method of claim 6, comprising the further steps of:
    extracting a surface of an object contained in a three dimensional structure based on data representing a three dimensional structure;
    detecting a non-boundary surface which is said surface of said object but which is not a boundary surface; and
    forming an image of said surface and said non-boundary surface of said object.

* * * * *